US 6,592,171 B1

(12) United States Patent
Hinds

(10) Patent No.: US 6,592,171 B1
(45) Date of Patent: Jul. 15, 2003

(54) DUMP BODY STRUCTURE FOR AN OFF-HIGHWAY TRUCK

(75) Inventor: James R. Hinds, Taylorville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/072,170

(22) Filed: Feb. 7, 2002

(51) Int. Cl.⁷ ............................................. B60R 27/00
(52) U.S. Cl. ...................................................... 296/184
(58) Field of Search ............................ 296/29, 30, 184; 403/13, 14, 270, 271; 228/165, 167

(56) References Cited

U.S. PATENT DOCUMENTS

| | | | |
|---|---|---|---|
| 3,790,090 A | 2/1974 | Lorenc et al. | |
| 3,851,981 A | * 12/1974 | Corsi et al. | ............. 403/271 X |
| 4,162,096 A | 7/1979 | Proeschl | |
| 4,470,717 A | 9/1984 | Bruhnke et al. | |
| 4,543,008 A | 9/1985 | Salama et al. | |
| 4,595,311 A | 6/1986 | Salama et al. | |
| 4,964,749 A | 10/1990 | Saari | |
| 4,993,619 A | * 2/1991 | Kresse, Jr. et al. | ......... 228/135 |
| 5,190,207 A | * 3/1993 | Peck et al. | .................. 228/170 |
| 5,399,046 A | 3/1995 | Stielau et al. | |
| 5,437,499 A | 8/1995 | Musso | |
| 5,794,398 A | 8/1998 | Kaehler et al. | |
| 6,123,378 A | * 9/2000 | Teply et al. | .................. 296/29 |
| 6,129,409 A | 10/2000 | D'Amico | |
| 6,131,286 A | 10/2000 | Kelly et al. | |
| 6,135,666 A | 10/2000 | Kelly et al. | |
| 6,241,144 B1 | 6/2001 | Mandon | |
| 6,402,414 B1 | * 6/2002 | Kanodia et al. | .............. 296/30 |

\* cited by examiner

*Primary Examiner*—Dennis H. Pedder
(74) *Attorney, Agent, or Firm*—Thomas L Derry; Larry G Cain

(57) ABSTRACT

The present invention provides a dump body having an improved skeletal structure reinforcing the body. The skeletal structure includes a plurality of longitudinal and vertical ribs. The ribs include at least one side leg and an exterior leg adjacent to the side leg. A cutout portion is defined in the exterior leg of the longitudinal legs. The cutout portion is adapted to receive a tab portion of a corresponding vertical rib. The exterior legs of the longitudinal ribs and vertical ribs are defined on a single plane. At the intersection of each cutout portion and tab portion a groove is defined. The groove is adapted to receive a weld of substantially similar mechanical properties of the rib material.

18 Claims, 4 Drawing Sheets

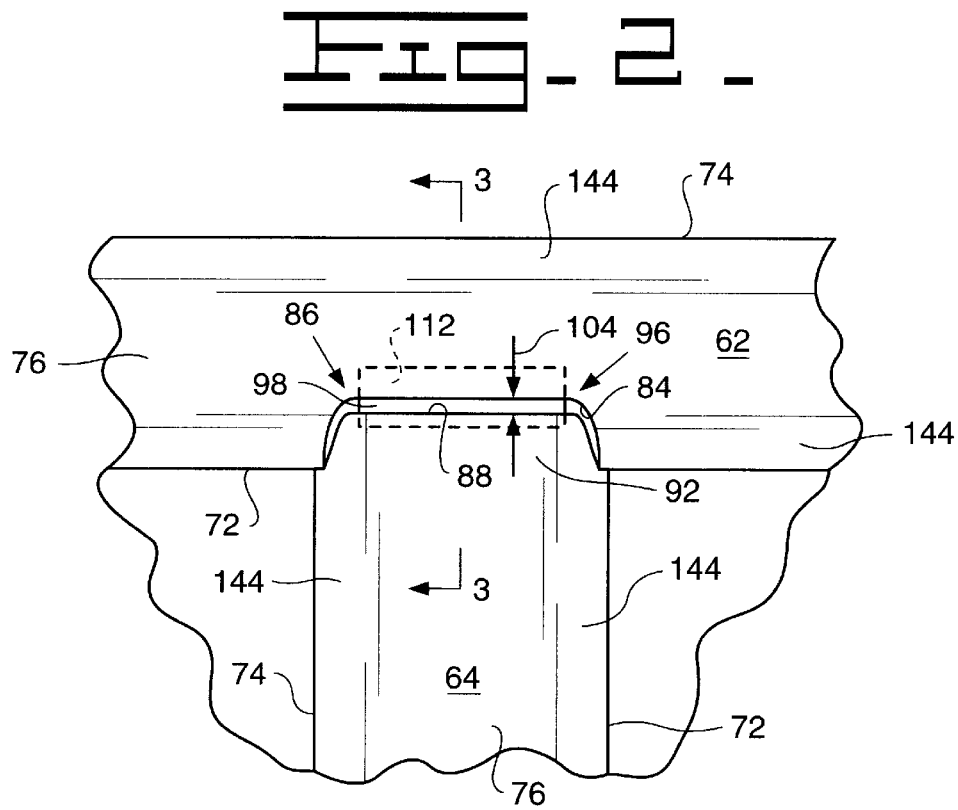
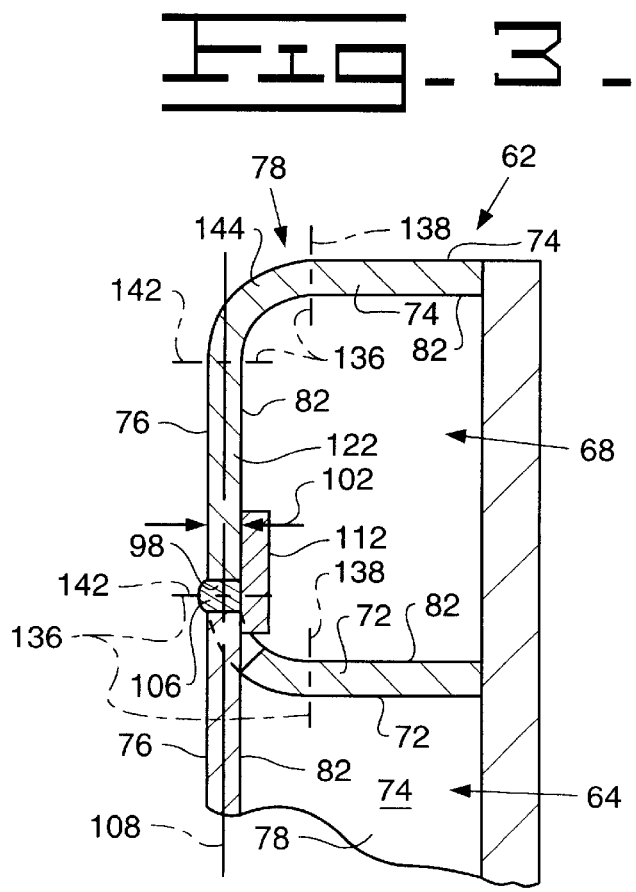

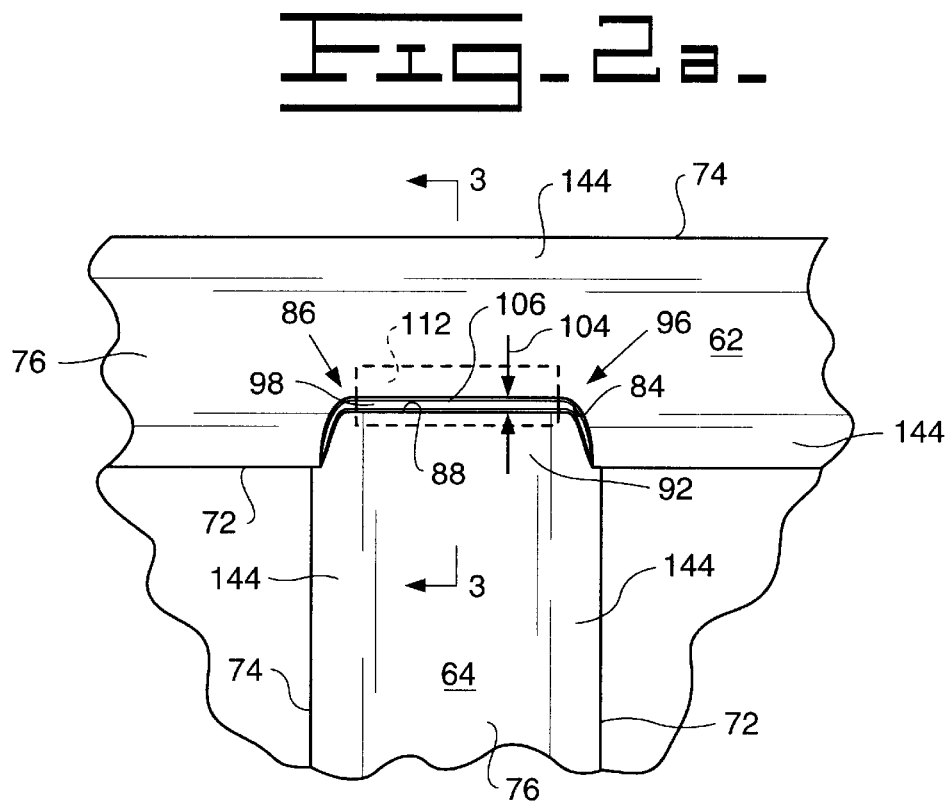
Fig_2a_
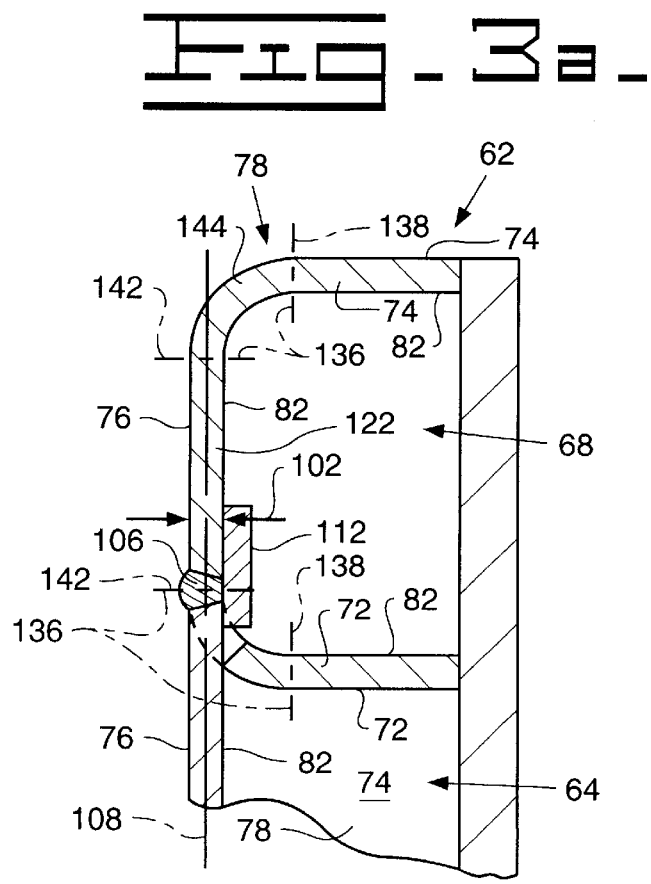
Fig_3a_

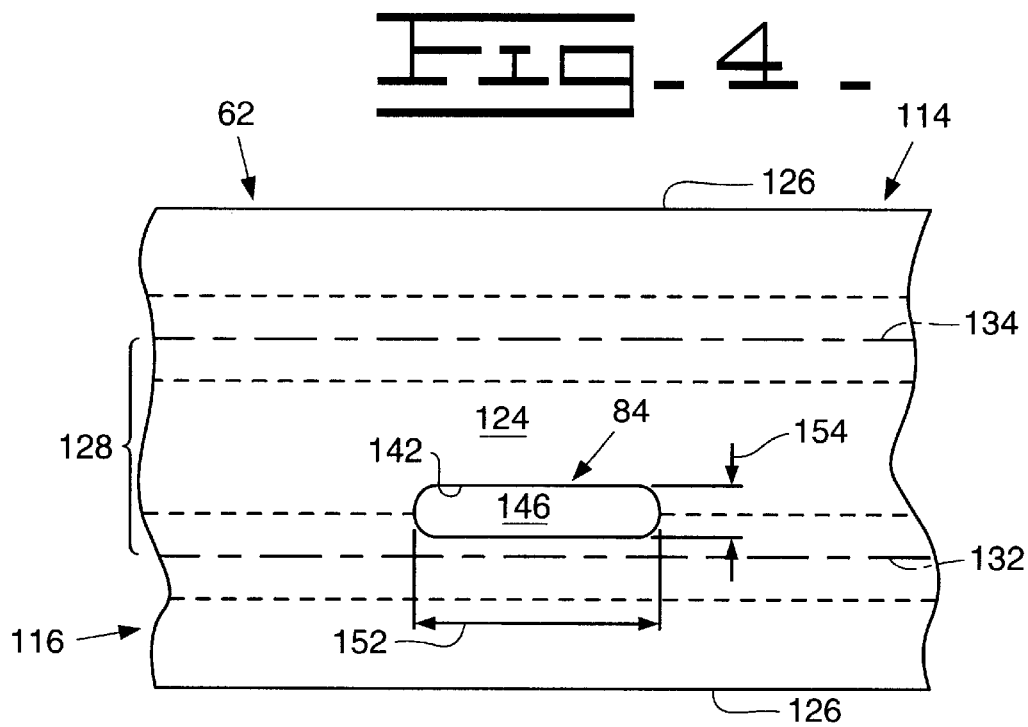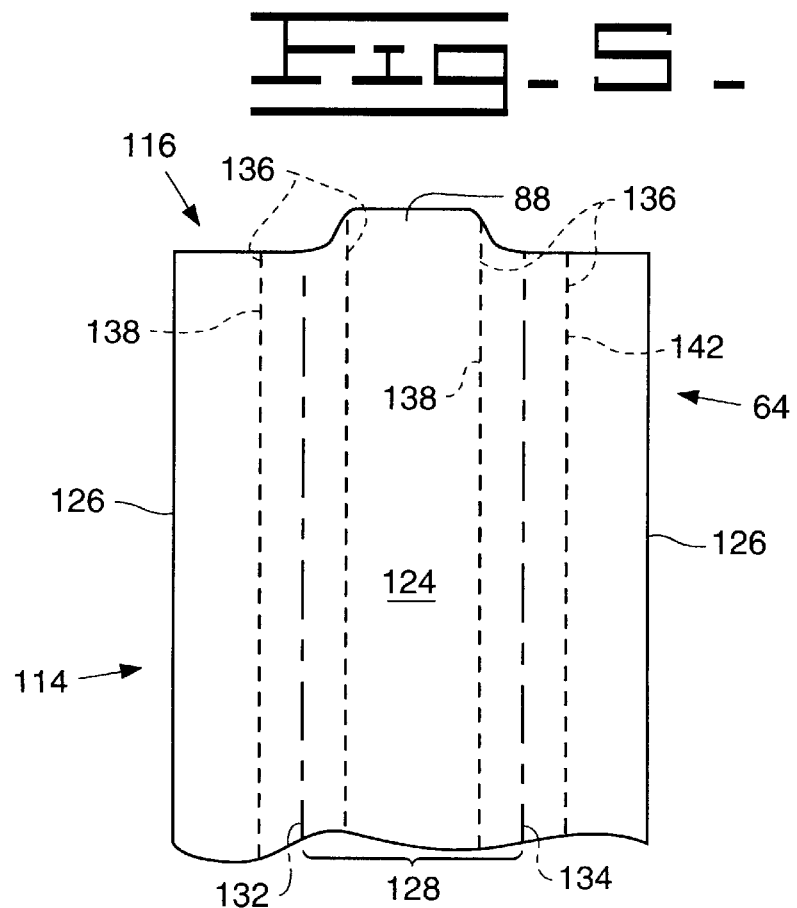

DUMP BODY STRUCTURE FOR AN OFF-HIGHWAY TRUCK

TECHNICAL FIELD

This invention relates generally to a dump body for an off-highway truck, and more specifically to an improved design skeletal structure for the body.

BACKGROUND

Off-highway trucks having dump bodies are used in a variety of applications such as, mining and construction industries. Typical bodies include a box made up of a floor having a pair of sides extending vertically upward from the floor, and a front extending upward from the floor and between the sides. Often a skeletal structure, or skeleton, is constructed on an outer surface of the box; the skeleton acts to strengthen the box.

U.S. Pat. No. 4,162,096 discloses a dump body for an off-high truck having a skeletal structure supporting a dump body. The skeletal structural disclosed utilizes longitudinal ribs and vertical ribs that are disposed substantially perpendicular to the longitudinal ribs. Most ribs have a substantially "U" shaped cross-section including a pair of legs and an exterior leg disposed therebetween. The ribs may be formed from a single piece of flat plate or in some instances formed of two or more flat plates. At the joints, or intersections, of longitudinal and lateral ribs it is typical to fit the vertical rib flush to the longitudinal rib with a minimal gap. The ribs are then welded using a filet weld between the vertical rib and the longitudinal rib.

During normal operation these dump bodies undergo numerous loading, hauling and dumping cycles. The repeated cycles transmit a variety of multi-directional stress forces through the body structure. Also during loading cycles, a front end loader may be used to dump material over the side of the truck. Occasionally, overly aggressive loader operators impact the side of the dump body with the loader linkage. This impacting, causes additional stress forces to be transmitted through the rib structure. As these stress forces move from longitudinal ribs to vertical ribs, the forces follow exterior legs, changing directions and passing through the filet welds. Fatigue weakens the structure near the intersections of the longitudinal ribs and vertical ribs. Occasionally, the weld joint cracks near the intersections of the ribs.

The present invention overcomes many of the above stated problems.

SUMMARY OF THE INVENTION

The present invention provides a truck having a frame, a plurality of wheels rotatably disposed on said frame, an engine and drive train drivingly attached to said wheels, and a dump body. The dump body includes a skeletal structure including a plurality of longitudinal ribs and vertical ribs. The longitudinal and vertical ribs have at least one side leg and an exterior leg. The longitudinal and vertical ribs are connected by a weld joint. The weld joint includes a cutout portion positioned at an intersection of a vertical leg. A tab portion is defined on the exterior leg of the vertical rib, the tab portion being adapted to interfit the cutout portion. A groove is defined between the cutout portion and the tab portion. The exterior leg of said longitudinal rib and the vertical rib are defined on a single planer surface. A weld is deposited in the groove joining the longitudinal rib and the vertical rib.

BRIEF DESCRIPTION OF THE DRAWINGS

FIG. 2 is an enlarged portion of FIG. 1 as taken within line "2—2", illustrating the intersection of a longitudinal rib and a vertical rib of the present invention.

FIG. 2a is an enlarged portion of FIG. 1 as taken within line "2—2", illustrating a v-groove at the intersection of a longitudinal rib and a vertical rib of the present invention.

FIG. 3 is a cross sectional view illustrating the intersection of ribs as taken in lines "3—3" of FIG. 2.

FIG. 3a is a cross sectional view illustrating a v-groove at the intersection of ribs as taken in lines "3—3" of FIG. 2.

FIG. 4 is a fragmentary view of a longitudinal rib of the present invention prior to being formed into a "U" shaped member.

FIG. 5 is a fragmentary view of a vertical rib of present invention prior to being formed into a "U" shaped member.

DETAILED DESCRIPTION

Figure 1:
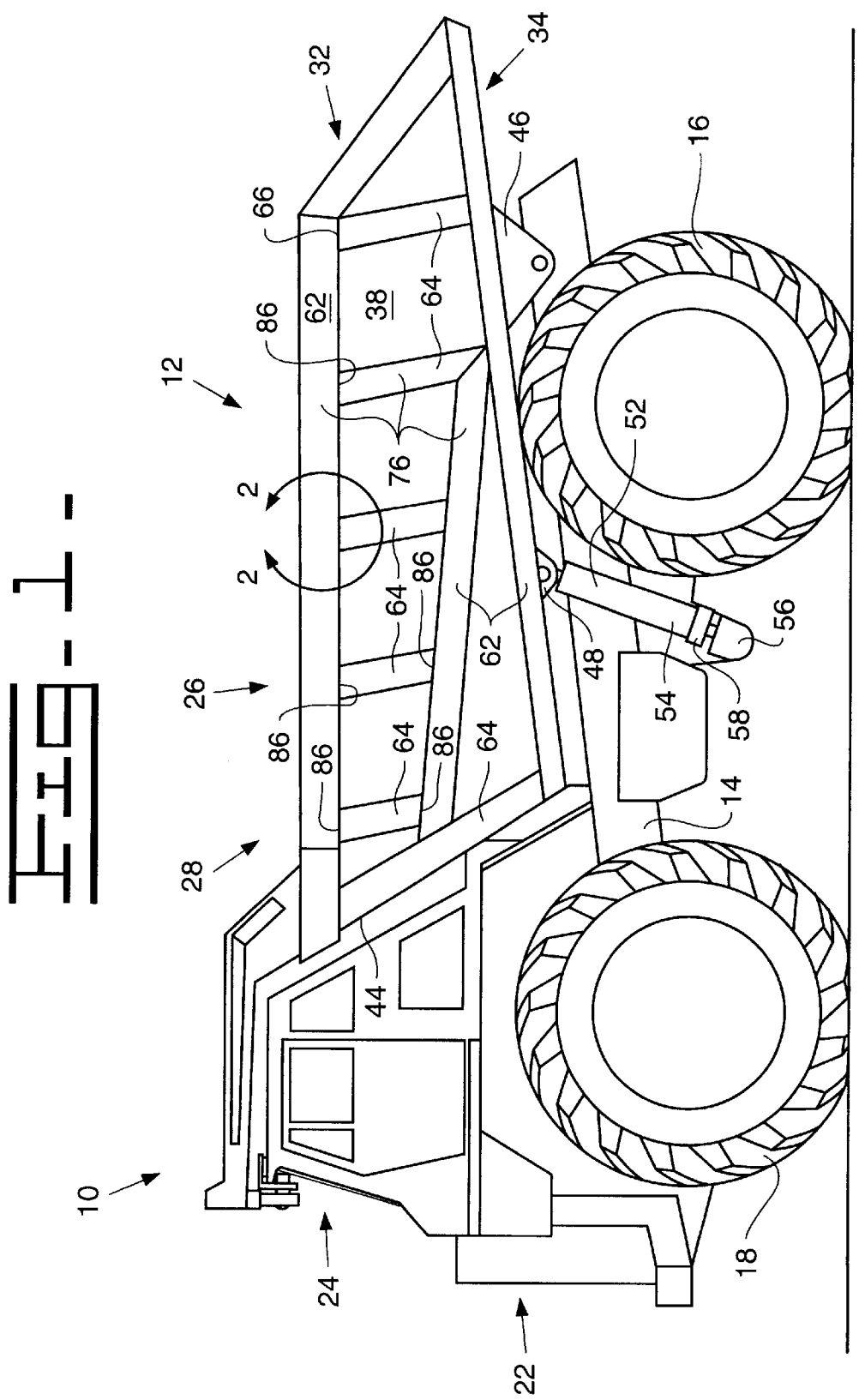
FIG. 1 is a side view of a truck body employing the rib structure of the present invention.

Referring to FIG. 1, an off-highway truck 10 having a dump body 12 fair employing the present invention is provided. The truck 10 includes a frame 14 having a plurality of rear wheels 16 and at least two front wheels 18. An engine compartment 22 and an operators cab 24 are mounted at one end of the frame 16. An engine (not shown) and a transmission (not shown) are mounted within the engine compartment 22 and are drivingly coupled to the rear wheels 16.

The dump body 12 includes a box portion 26 and a skeletal structure 28. The dump body 12 is typically made of steel, but may alternatively be made of any other suitable material, such as aluminum. The box portion 26 defines an inside surface 32 and an outside surface 34. The box portion 26 includes a floor 36, a first side wall 38, a second side wall (not shown) and a front wall 44 positioned between the first and second sides walls 38,42. A tailgate (not shown) may be provided to prevent payload from spilling from the dump body during transport. The tailgate is adapted to move between an open position and a closed position.

The dump body 12 is pivotally attached to the frame 14 by a pair of body supports 46. The body supports 46 are located on the outside surface 34 of the box portion 26, toward the rear of the dump body 12. A pair of cylinder brackets 48 are also provided on the outside surface 34 of the floor 36. The cylinder brackets 48 are positioned toward the front of the dump body 12. Each cylinder bracket 48 is adapted to receive a first end 52 of one of a pair of hydraulic cylinders 54. A second pair of cylinder brackets 56 are provided on the frame 14 and are adapted to receive a second end 58 of each hydraulic cylinder 54. The hydraulic cylinders 54 are moveable between a retracted position (shown) and an extended position (not shown). In the extended position the front of the dump body 12 is raised for ejecting the payload. In the retracted position the dump body 12 is in a down position for receiving payload.

Referring now to FIG. 2, an enlarged fragmentary view of the skeletal structure 28 taken inside line "2—2" on FIG. 1. The longitudinal rib 62 and the vertical rib 64 intersect to form a weld joint 66. The longitudinal rib 62 and vertical ribs 64 each define a substantially "U" shaped cross section 68 (shown in FIG. 3). Each rib 62,64 includes a first side leg 72, a second side leg 74 and an exterior leg 74, disposed therebetween. An outer surface 78 is located on the exterior leg 76 and an inner surface 82 is located opposite the outer surface 78. The longitudinal ribs 62 include a cutout portion 84 disposed on the exterior leg 76, extending from one of the first or second side legs 72,74 toward the other of the first or second side leg 72,74. The cutout portion 84 is located at each intersection 86 of a vertical rib 64. The cutout portion 84 serves to simplify assembly of the skeletal structure by providing a position location the vertical rib 64. A tab portion 88 is defined on each vertical rib 64 near a first end 92 or second end (not shown). The tab portion 88 is a portion of the exterior leg 76 that extends beyond the first end 92 or the second end 94 of the vertical rib 64. The cutout portion 84 and the tab portion 88 are adapted to interfit one and other, while providing a groove 96 between the tab portion 88 and the cutout portion 84.

The groove 96 is preferably a square groove 98, having a substantially equal depth 102 and width 104. Alternatively, the cutout portion and the tab portion may be adapted to define another shape groove, such as a "V" groove (not shown). The groove 96 is adapted to receive a weld 106 for securing the vertical ribs 64 to the longitudinal ribs 62.

Regarding FIG. 3 an enlarged cross-sectional view taken along line "3—3" of FIG. 2. It can be seen that the exterior leg 76 of both the longitudinal rib 64 and the vertical rib 62 are disposed on a single plane 108. A backup strip 112 is positioned to cover the groove 96 on the inner surface 82 of the exterior legs 76. The weld 106 is deposited into the groove 96 to fill the groove 96 in its entirety. The weld 106 is preferably a filler material having substantially the same mechanical properties of the longitudinal ribs 62 and the vertical ribs 64. The weld 106 may be ground flush with the exterior legs 76, although it is not required. Conventional welding methods will produce a weld joint 66 that is homogenous with the longitudinal ribs 62 and the vertical ribs 64.

Regarding FIGS. 4 and 5, fragmentary view of flat patterns of the longitudinal ribs 62 and vertical ribs 64 are illustrated. FIG. 4 illustrating the hole 146 of the longitudinal ribs 62 and FIG. 5 illustrating the tab portion 88 of the vertical rib 64. Although the ribs are preferably formed from steel plate 114, a number of alternatives may be used. One possible alternative being a preformed "C" channel or a cast channel having a cutout portion 84 or tab portion 88, as required. The steel plate 114 defines a first end 116, a second end (not shown), an inside surface 122 (shown in FIGS. 3 and 3a), an outside surface 124, and a pair of edges 126. A pair of bend lines 128 are illustrated, each being a predetermined distance from one of the pair of edges 126. The first bend line 132 represents the location where a press brake applies pressure to the steel plate 114 in order to form the first side leg 72. The second bend line 134 represents the location where the press brake applies pressure to form the second side leg 74. A pair of radius lines 136 are defined on each side of the pair of bend lines 128. A first radius line 138 nearest an one of the pair of edges 126 represents the approximate point on one of the first or second side legs 72,74 where a radius 144 will begin after the steel plate 114 is formed into a rib 62,64. The second radius line 142 represents the position on the exterior leg 76 where the radius 144 will end on the exterior leg.

As shown in FIG. 4, the cutout portion 84 is formed into the steel plate 144 prior to forming the first and second side legs 72,74. To form the cutout portion 84, a substantially oblong hole 146 is cut into the steel plate 114, extending from the outside surface 124 to the inside surface 122. The hole 146 includes a first edge 148 positioned near the first bend line 132. The hole 146 positioned between the first bend line 132 and the second radius line 142. The hole has a length 152 that is greater than a width 154 of the exterior leg 76 of the tab portion, by two times the steel plate 114 thickness. The hole 146 is substantially the same shape of the tab portion 88. The first end of the hole 146 is positioned a distance from the first edge 148 to provide clearance to permit the longitudinal rib 62 and vertical rib 64 to align.

As shown in FIG. 5, the tab portion 88 in defined on the steel plate 114 prior to the vertical rib 64 being formed. The first end 92 of the rib 64 is cut substantially perpendicular the pair of edges 125. The tab portion 88 extends beyond the first end 116 at a position between the second radius lines 142.

Industrial Applicability

The skeletal structure 28 according to the present invention is fabricated by forming the longitudinal ribs 62 and the vertical ribs 64. The ribs 62,64 are first cut from the steel plate 114 to a predetermined size and shape. The steel plates 114 for the longitudinal ribs 62 have elongated holes 146 cut from the outside surface 124 through to the inside surface 122. The holes 146 are positioned to correspond to the intersections 86 of the ribs 62,64. The steel plates 114 for the vertical ribs 64 are also cut to appropriate size and shape. As required, one or both ends 92,94 are cut to define the tab portion 88. Using conventional forming techniques, the steel plates 114 are bent along the first bend line 132, forming the first side leg 72 and the adjacent radius 144. Next the steel plate 114 is bent along the second bend line 134, forming the second side leg 74 and its adjacent radius 144.

The now formed ribs, are positioned so that appropriate tab portions 88 of vertical ribs 64 interfit the appropriate cutout portion 84 of the longitudinal rib 62, while leaving the groove 96 between the tab portion 88 and the cutout portion 84. The groove 96 is preferably square, being of a width similar to the thickness of the steel plate 114. A backup strip 112 is positioned on the inside surface of the longitudinal rib 62 to cover the groove 96. The backup strip 112 is then tack welded in position. From the outside surface 124, a weld 106 is deposited into the groove 96, using conventional techniques. The weld 106 preferably fills the entire groove 96 to create the weld joint 66. A filet weld is used to secure the first side leg 72 and second side leg 74 of the vertical rib 64 to the one of the first or second side legs 72,74 of the longitudinal rib 62. As desired, the weld 106 can be ground flush with the outside surface 124. The above procedure is repeated until all weld joints 66 of the skeletal structure have been completed.

During operation of the truck 10, the stress forces acting upon the dump body 12 from loading, hauling and dumping are less likely to cause fatigue induced failure of the dump body 12. Strength of the dump body 12 is maximized in part because, the exterior legs 76 of both the longitudinal ribs 62 and vertical ribs 64 are on substantially a single plane 108, and the weld 106 creating a homogeneous intersection 86 having similar mechanical properties. Additionally, because the cutout portion 84 is located in the exterior leg 76, without fracturing the adjacent side leg 72,74, the longitudinal rib 62 maintains the original strength of a single section or wall.

Using this design, stress forces induced during normal operation tend to flow in a straight path longitudinally and vertically without transferring from structural member to structural member, or plane to plane.

What is claimed is:

1. A weld joint for a skeletal structure of an off-highway truck body, said skeletal structure having a plurality of longitudinal ribs and vertical ribs, said longitudinal and vertical ribs having at least one side leg and an exterior leg adjacent to said at least one side leg, said longitudinal and vertical ribs being connected by said weld joint, said weld joint comprising:

a cutout portion disposed in said exterior leg of said longitudinal rib, said cutout portion positioned at an intersection of a vertical rib;

a tab portion defined on said exterior leg of said vertical rib, said tab portion extending beyond said at least one side leg, said tab portion being adapted to interfit said cutout portion and defining a groove between said cutout portion and said tab portion;

said exterior leg of said longitudinal rib and said vertical rib being disposed on a single planer surface; and a weld deposited in said groove, said weld joining said exterior leg of said longitudinal rib and said exterior leg of said vertical rib.

2. The weld joint of claim 1 further including a backup strip positioned on an inner surface of at least one of said exterior legs to cover said gap.

3. The weld joint of claim 1 wherein said groove is a substantially square groove.

4. The weld joint of claim 1 wherein said groove is a "V" groove.

5. The weld joint of claim 1 wherein said vertical rib defines a substantially "C" shaped cross section.

6. The weld joint of claim 1 wherein said longitudinal rib is formed of steel plate having a cutout a predetermined distance from a first edge of said plate.

7. The weld joint of claim 1 wherein said vertical fib is formed of steel plate.

8. The weld joint of claim 1 wherein said longitudinal rib is manufactured from a casting.

9. The weld joint of claim 1 wherein said vertical rib is manufactured from a casting.

10. An off-highway truck comprising:

a frame;

a plurality of wheels rotatably disposed on said frame;

an engine and drive train drivingly attached to said wheels;

a dump body having a skeletal structure including a plurality of longitudinal ribs and vertical ribs, said longitudinal and vertical ribs having at least one side leg and an exterior leg adjacent to said at least on side leg adjacent the side leg, said longitudinal and vertical ribs being connected by a weld joint;

a cutout portion disposed in said exterior leg of said longitudinal rib, said cutout portion positioned at an intersection of a vertical rib;

a tab portion defined on said exterior leg of said vertical rib, said tab portion extending beyond said at least one side leg, said tab portion being adapted to interfit said cutout portion and defining a groove between said cutout portion and said tab portion; said exterior leg of said longitudinal rib and said vertical rib being defined on a single planer surface; and a weld deposited in said groove, said weld joining said exterior leg of said longitudinal rib and said exterior leg of said vertical rib.

11. The off-highway truck of claim 10 further including a backup strip positioned on an inner surface of at least one of said exterior legs to cover said gap.

12. The off-highway truck of claim 10 wherein said groove is a substantially square groove.

13. The off-highway truck of claim 10 wherein said groove is a "V" groove.

14. The off-highway truck of claim 10 wherein said vertical rib defines a substantially "C" shaped cross section.

15. The off-highway truck of claim 10 wherein said longitudinal rib is formed of steel plate having a cutout a predetermined distance from a first edge of said plate.

16. The off-highway truck of claim 10 wherein said vertical rib is formed of steel plate.

17. The off-highway truck of claim 10 wherein said longitudinal rib is manufactured from a casting.

18. The off-highway truck of claim 10 wherein said vertical rib is manufactured from a casting.

* * * * *

UNITED STATES PATENT AND TRADEMARK OFFICE
CERTIFICATE OF CORRECTION

PATENT NO. : 6,592,171 B1  Page 1 of 1
DATED : July 15, 2003
INVENTOR(S) : James R. Hinds It is certified that error appears in the above-identified patent and that said Letters Patent is hereby corrected as shown below:

Column 5,
Line 30, "fib" should be -- rib --

Column 6,
Line 14, after "portion;" a new paragraph should begin with the word "said exterior leg..."

Signed and Sealed this

Twenty-third Day of December, 2003

JAMES E. ROGAN
*Director of the United States Patent and Trademark Office*